Nov. 27, 1951  J. E. VALENTE  2,576,864
MOLDED FILTER PRODUCT
Filed July 13, 1946  5 Sheets-Sheet 1

Inventor,
John E. Valente
By
Doane, Pond & Anderson
Attys

Nov. 27, 1951  J. E. VALENTE  2,576,864
MOLDED FILTER PRODUCT
Filed July 13, 1946  5 Sheets-Sheet 2

Inventor.
John E. Valente
By Soans, Pond & Anderson
Attys.

Nov. 27, 1951 J. E. VALENTE 2,576,864
MOLDED FILTER PRODUCT
Filed July 13, 1946 5 Sheets-Sheet 3

Inventor.
John E. Valente
By
Soans, Pond & Anderson
Attys.

Nov. 27, 1951 J. E. VALENTE 2,576,864
MOLDED FILTER PRODUCT
Filed July 13, 1946 5 Sheets-Sheet 4
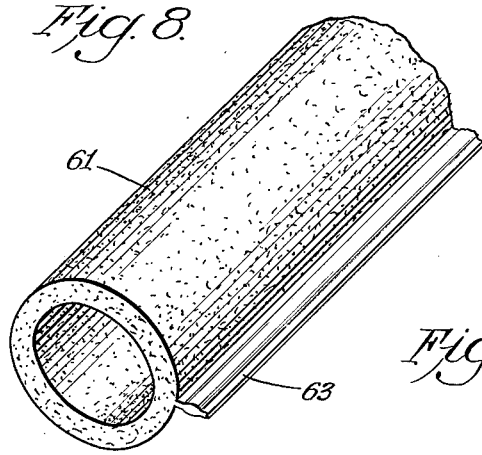
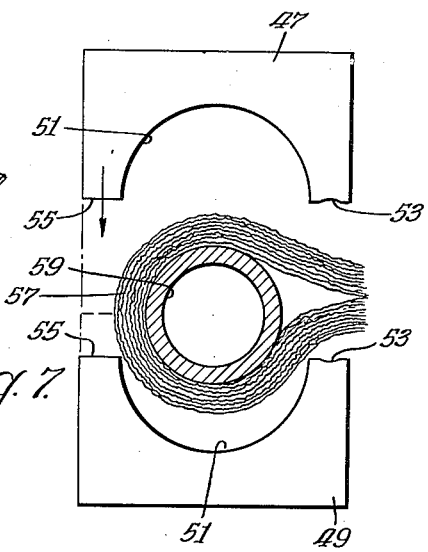
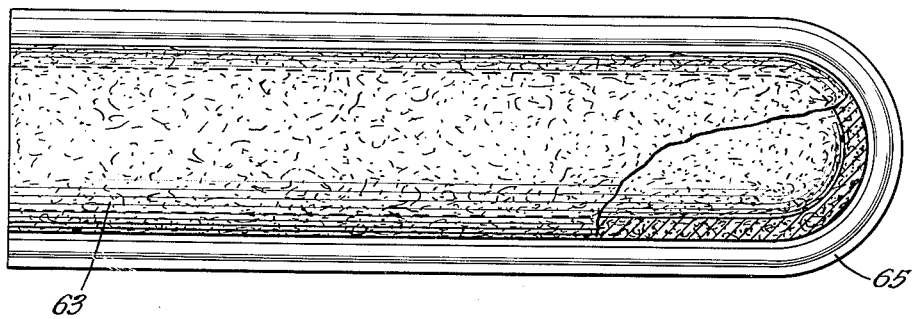
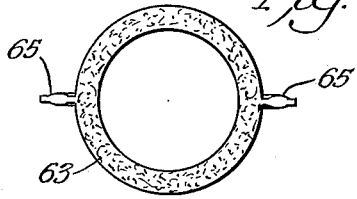
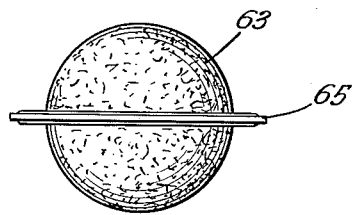
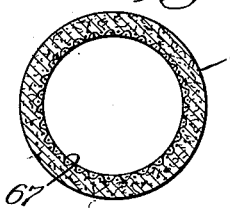
Inventor
John E. Valente
By
Soans, Pond & Anderson
Attys.

Nov. 27, 1951  J. E. VALENTE  2,576,864
MOLDED FILTER PRODUCT
Filed July 13, 1946  5 Sheets-Sheet 5
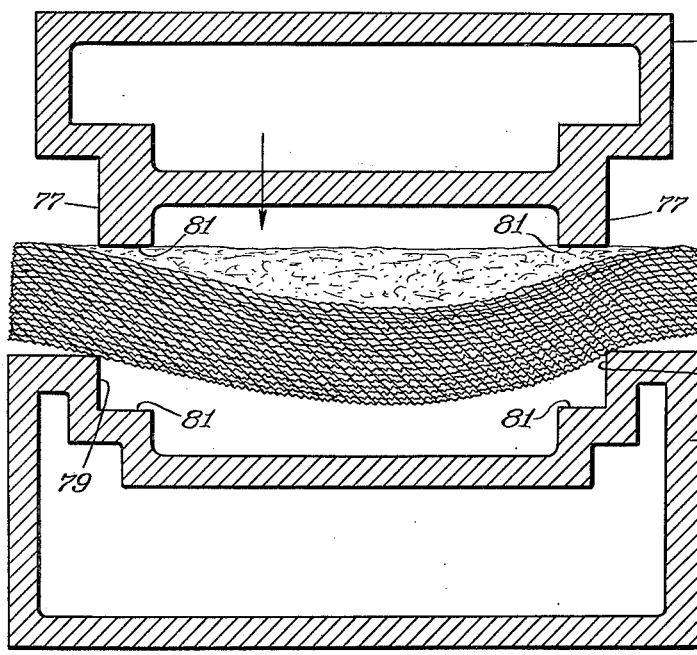
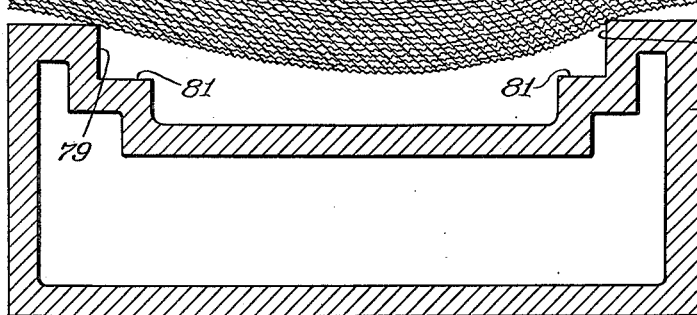
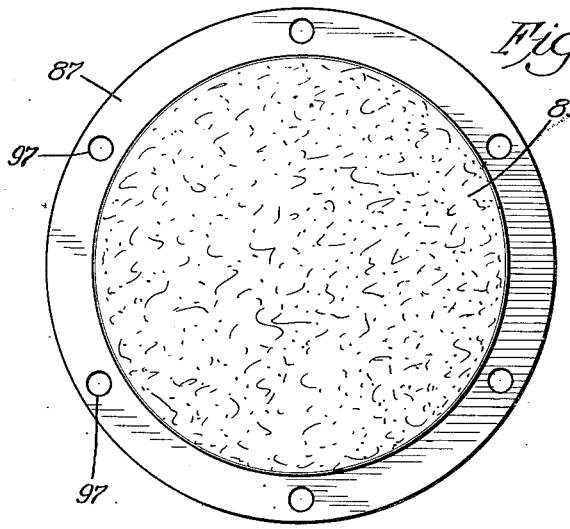
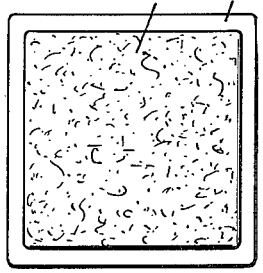
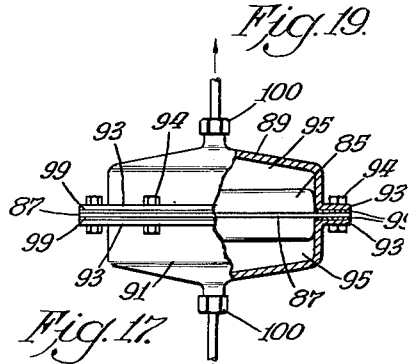
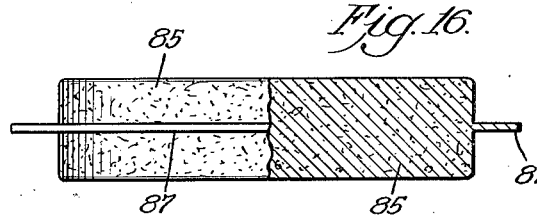
Inventor
John E. Valente
By
Doane, Pond & Anderson
Attys.

Patented Nov. 27, 1951

2,576,864

UNITED STATES PATENT OFFICE 2,576,864

MOLDED FILTER PRODUCT

John E. Valente, Neenah, Wis., assignor to Paper Patents Company, Neenah, Wis., a corporation of Wisconsin Application July 13, 1946, Serial No. 683,336

9 Claims. (Cl. 210—204)

The present invention relates to replaceable filter elements and is particularly concerned with the provision of an improved, replaceable, filter element of the general type disclosed in application Serial No. 601,874 (now abandoned), which was filed on June 27, 1945, and which is assigned to the same assignee as the present invention.

The filter element of the above identified application is particularly adapted for the filtering of liquids and is especially satisfactory for filtering petroleum derivatives, such as gasoline, fuel oil and lubricating oil, and other hydrocarbon liquids. It comprises a self-supporting, tubular member which is manufactured by winding a suitable number of plies of a thin, creped, resin impregnated, cellulosic sheet onto a suitable mandrel, and then curing the resin component of the resultant tubular structure in an oven under suitable conditions of heat, with or without added pressure, to react or polymerize the resin. The resultant filter element is a low density, relatively strong, light weight, porous walled, hollow tube which is adapted to be connected into liquid filtering systems of various types. Desirably the liquid to be filtered is caused to flow through the filter element in a generally radial direction. The filter element is self-supporting and possesses considerable inherent mechanical strength. It may be readily installed in the associated apparatus without the need of any special support means and without any special precautions to preserve its shape or structure. Replacement of the filter element is likewise very simple and easy to effect.

This filter element has been subjected to extensive tests and has proven highly satisfactory. The element has a very high extraction ratio, yielding a very pure filtrate, and at the same time the flow rate, or capacity of the filter to handle large quantities of liquid, is maintained at a high level throughout its useful life. Its manufacture, however, presents certain difficulties which have tended to make the cost of the product rather high, and, as will hereinafter appear, an important feature of the present invention consists in the provision of an improved method for manufacturing self-sustaining filter elements of this general construction. The invention also includes the provision of a number of novel filter elements having certain advantages over the particular filter element of the above identified application. The various features of the invention will be made more apparent in the following description and the accompanying drawings of illustrative embodiments thereof.

In the drawings:

Fig. 1 is a perspective view of a multi-ply pad or bat of the type preferably employed as the basic raw material in the manufacture of the filter elements of the invention;

Figs. 2, 3 and 4 views illustrating steps in the manufacture of the filter products of the invention;

Fig. 7 is a view illustrating a somewhat different method of practicing the invention;

Fig. 8 is a perspective view illustrating the product resulting from the method illustrated generally in Fig. 7;

Figs. 9, 10 and 11 are plan and end views of a modified form of the filter element of the invention;

Figs. 12 and 13 illustrate, respectively, one step in the manufacture, and the resultant product, of still another embodiment of the invention;

Fig. 14 illustrates one method of manufacturing a further embodiment of the invention;

Figs. 15 and 16 are plan and elevational views, the elevational view being partially in section, of the filter element resulting from the manufacturing procedure illustrated generally in Fig. 14;

Fig. 17 illustrates the filter element of Figs. 15 and 16 in use in a filtering equipment which is suitable for filtering fuel oil, gasoline and the like; and Figs. 18 and 19 are plan and elevational views of a second type of filter element resulting from the manufacturing procedure illustrated generally in Fig. 14.

Figure 1:
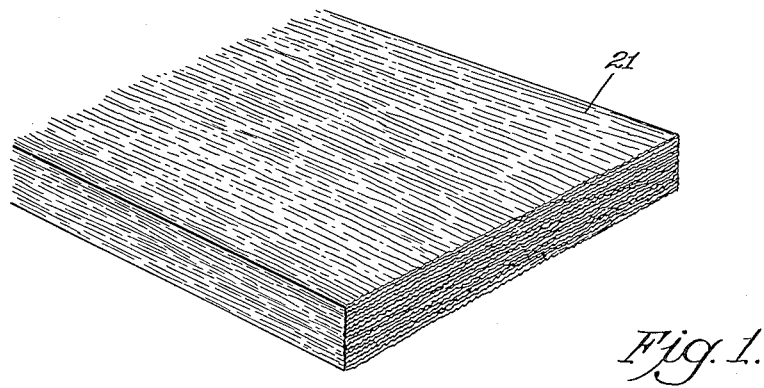

As previously stated, the filter element of the present invention is manufactured from a multi-ply pad or bat product. This is made by superposing a plurality of sheets of thin, creped, cellulosic tissue which have been impregnated with a plastic bonding material which will usually comprise a thermo-setting resin, but which may in some instances comprise a thermo-plastic resin. Desirably, the constituent sheets of the pad or bat are similarly arranged, i. e. the creping in all the sheets extends in the same direction. Such a pad or bat is shown at 21 in the drawings. The impregnated sheets are preferably dried prior to the formation of the pad or bat product, but the resin impregnation is not substantially reacted.

In the manufacture of the filter element a suitably dimensioned pad or bat of resin impregnated sheets, as described above, is placed within a mold, desirably with a mandrel or mandrels, and the entire assembly is subjected to heat and pressure to shape the pad or bat into the desired form and to cure or react the resin, so that the resulting structure will be integrally bonded together to provide a mechanically strong, self-supporting product. Single filter units or multiple units can be manufactured by this method, as will hereinafter appear, and the method inherently lends itself to the production of filter elements having relatively dense, strong, flanges or fins which constitute an integral part of the filter element. These ribs or flanges may be utilized to mechanically interconnect and strengthen the individual elements of multiple units or they may be employed for the purpose of mounting single unit elements.

Various grades and types of cellulosic sheets, such as wadding, tissue, etc. are useable in the practice of the invention. Desirably, however, the sheet should have a dryer basis weight, i. e. the basis weight of the dry sheet before creping, within the range of from about 5 to 10 pounds for 480 sheets 24 by 36 inches and a crepe ratio, when manufactured, of from about 1.4 to 3.0. The lighter weight sheets produce a filter product having a somewhat higher flow rate than is the case when the heavier basis weight sheets are used. The heavier sheets produce a filter element which is stronger mechanically and which is of greater density, and which is better adapted for the filtering of extremely fine suspended particles.

The constituent sheets of the pad or bat employed in the manufacture of the filter products of the invention may be impregnated with the plastic bonding material after they have been superposed into pad or bat form, but it will generally be found much more convenient to impregnate the sheets either on the paper making machine during their manufacture, or on suitable treating apparatus prior to the assembly of the sheets.

As indicated above, the plastic bonding material will usually constitute a thermo-setting resin, although in some instances it is possible to use a thermo-plastic resin, and in instances where relatively cold liquids are to be filtered the thermo-plastic resins may have certain advantages over the thermo-setting resins. A most useful form of the invention is one in which the filter element constitutes a rigid, relatively strong, self-supporting tube, and in the manufacture of such elements particularly satisfactory results have been obtained by the use of various of the formaldehyde thermo-setting resins, including phenol, resorcinol, urea, and melamine formaldehyde resins. These resins may be water soluble as, for example, various of the phenol formaldehydes or they may be soluble in alcohol, benzene, xylol, or other non-aqueous solvents. Contact pressure or polyester resins may also be used, specific examples being: glycol phthalate maleate, glycol maleate, glycol fumarate, diallyl phthalate, diallyl maleate, and glycol methacrylates.

The purpose of the plastic bonding material is primarily that of imparting strength and insolubility to the cellulosic fibers constituting the bulk of the filter, and this is effected by substantially coating or impregnating the individual fibers with the bonding material. When a water soluble resin is used there is some swelling of the fibers as an incident to the impregnation, and the swelling remains, at least in part, when the resin is cured or set. Accordingly, when the maximum flow rate is desired it is usually advantageous to employ a non-aqueous solvent for the resin, this procedure avoiding the swelling of the cellulosic fibers.

Where a non-aqueous liquid vehicle is employed, there is less danger of reducing the wet strength or stability of the creped tissue than in the case of an aqueous vehicle. Therefore, the impregnation and handling of the web which has been impregnated with a resin in a non-aqueous vehicle are relatively more simple than in the case of a resin dissolved or dispersed in an aqueous medium. In the latter case, greater care must be taken to preserve the crepe structure and to keep the web intact while it is wetted with the aqueous liquid, and until it is reasonably dry.

The group of thermo-plastic resins which may be used for the manufacture of filter elements in accordance with the invention, includes various vinyl and polystyrene resins, methyl methacrylate, various of the cellulose ester materials, rubber resins, and alkyd resins. Some of these are soluble or dispersible in water; others are either liquids themselves or are soluble or dispersible in various of the non-aqueous solvents; and some are capable of forming true emulsions. The addition of these materials to the sheet may thus be accomplished by various procedures.

The thermo-plastic containing product has a much more limited field of usefulness than the thermo-setting resin containing product. Regardless of other considerations, if a thermo-plastic material is used, it must have a softening point which is materially above the highest temperature to which the filter element will be exposed during its operating life. The use of thermo-plastic resins does, however, make possible the manufacture of filters which have particularly desirable strength and other physical characteristics when used for the filtration of materials which are maintained at low temperatures.

The percentage of the resin or plastic bonding material introduced into the constituent sheets of the initial pad or bat will depend upon the character of the sheet material and upon the purpose for which the filtering element is to be used. Amounts of bonding agent capable of providing, when cured, from about 25 to 30 percent of the weight of the finished product can be used in some instances, i. e. when a urea formaldehyde resin is used, although generally a greater amount of resin will be found desirable. When using phenolic formaldehyde resins the minimum amount should be about 35 percent of the finished filter product. There is little advantage in increasing the amount of the resin bonding agent over about 65 percent of the weight of the finished filter product. In general, an increase in the percentage of the resin or plastic bonding agent increases the strength and rigidity of the resultant filter product, although there is some reduction in the maximum obtainable flow rate when relatively large amounts of bonding material are used.

The density of the resultant filter unit is to some extent an index of the flow rate and the effectiveness of the filter in removing very fine particles. The density should be such as to produce a product having specific gravity within the range of from about .20 to .45, that is a product having a weight density of from about 12 to 28 pounds per cubic foot. When cellulosic sheets of the basis weights and crepe ratios set forth above and with plastic contents and unit densities within the stated ranges are used, the resultant filter wall in the completed product will be found to have from about 240 to 320 plies per inch of thickness. The integral reinforcement portions desirably have a density of from about 15 to 30 times the density of the filter wall portions.

The thickness of the filter wall will depend on the characteristics desired in the completed filter. For filtering relatively clean liquids at high flow rates the filter wall may be as thin as $\frac{1}{16}$ inch, and for extreme filtering requirements it might be as thick as 2 or 3 inches. The usual values are within the range of about $\frac{1}{4}$ to 1 inch.

Figure 2:
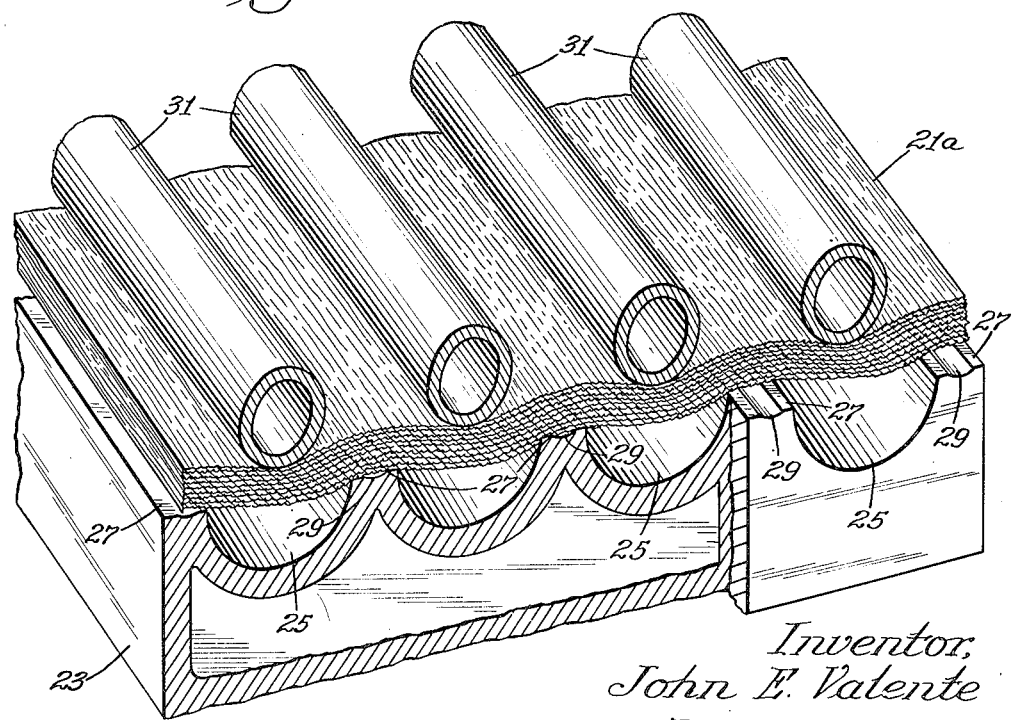

Referring to the specific examples of the method and products of the invention which are illustrated in the drawings, Fig. 2 shows, in somewhat diagrammatic form, a hollow mold section 23 which is adapted for use in the manufacture of the multiple unit type filter unit of the invention. The mold section 23 is provided with four, spaced-apart, parallel, grooves 25 which are circular in cross section and which extend the full length thereof. The grooves 25 comprise the mold cavities which define the outer surface of the resultant product, and they are spaced apart by horizontally extending mold portions 27, the width of which determines the separation of the individual filter elements. To facilitate the molding operation the horizontal mold portions 27 intermediate the grooves 25 are desirably provided with shallow, secondary grooves 29, the functions of which will be explained in a subsequent paragraph.

As the first step in the molding operation, a pad or bat 21a comprising a suitable number of plies of creped, cellulosic tissue which have been impregnated with a bonding resin, as above described, is placed over the upper surface of the mold section 23, as shown in Fig. 2. In the manufacture of a product particularly adapted for the filtering of fuel oil for a diesel engine, the product having an outside diameter of about 2¼ inches and an inside diameter of about 1¼ inches, the pad or bat 21a comprised 119 sheets of a thin, creped, cellulosic tissue having a dryer basis weight of 5.9 pounds for 480 sheets 24 by 36 inches, a crepe ratio of approximately 2.0, and containing 60 per cent (on a dry sheet basis) of a water soluble phenol formaldehyde, thermosetting resin capable of being polymerized at a temperature of about 320° F. in five minutes.

Figure 3:
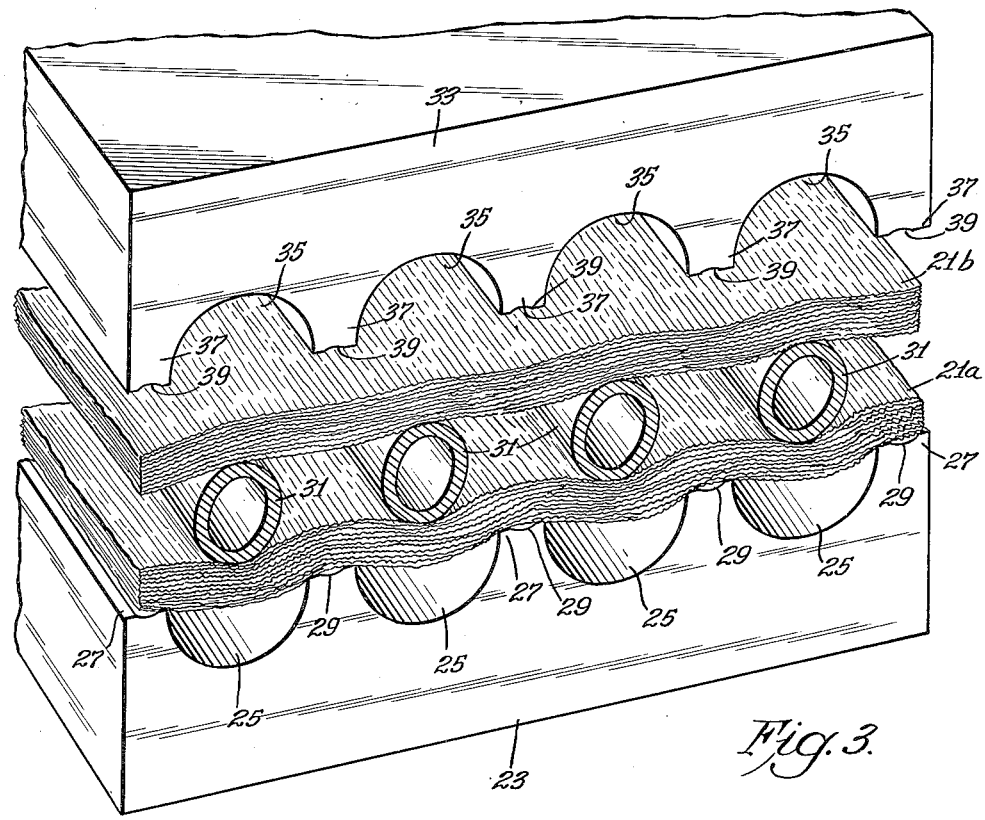

After the pad or bat 21a has been placed on the surface of the mold section 23, suitable, hollow, cylindrical, mandrels 31, which preferably are capable of being heated, either by passing steam therethrough or by electrical means, are placed in position to overlie the pad or bat 21a in alignment with the grooves 25. A second pad or bat 21b of similar dimensions is then placed over the mandrels 31, as shown in Fig. 3, and the upper half section 33 of the mold which is complementary to the lower section 23 and which may also be hollow in order that it may be heated, is moved into position so as to press the the two pads or bats 21a and 21b around the mandrels 31. In effect, a single thick pad or bat is placed within the mold structure with the mandrels 31 disposed between the plies thereof centrally of such thick pad or bat. The spaced apart semi-cylindrical grooves 35 in the upper mold section 33 are similar in dimensions and spacing to the grooves 25, and the horizontal mold portions 37 separating the grooves 35 have a secondary groove 39 similar to the grooves 29.

The mold sections are pressed together so as to produce a pressure of from about 250 to 350 pounds per square inch between the narrow mold portions 27 and 37 which form the ribs or flanges in the completed filter elements, and a pressure of from about .2 to 2.0 pounds per square inch in the portions of the pads or bats disposed between the surfaces of the mandrels 31 and the cooperating grooves 25 and 35. In a mold of the type described above, this will involve bringing together the two half sections 23 and 33 of the mold so as to provide a separation of about $\frac{1}{16}$ inch between the opposed, rib defining, mold portions 27 and 37.

It will be understood that the range of molding pressures indicated above will be obtained only when a pad or bat of a particular thickness is used in the mold. The stated range is considered as an optimum range when using materials of the type described above, but to a certain extent, the range is more of a result than a requirement. Satisfactory products can be produced despite rather substantial variation in the molding pressures, particularly in the rib or flange defining sections of the mold. For example, if a greater filter density is required, a considerably thicker pad or bat than the optimum thickness for which the mold is designed can be placed in the mold cavity, and the mold halves pressed together with sufficient force to obtain the proper filter wall thickness. Since the mold is of fixed dimensions, most of the increased pressure in such instance will appear in the flange portion, and this greatly increased pressure in that portion will have little effect on the pressure in the main body of the filter. Changes in the resin bonding material may also change the optimum molding pressures. Contact resins, for example, should be molded at much lower pressures than phenolic formaldehyde resins.

Figure 4:
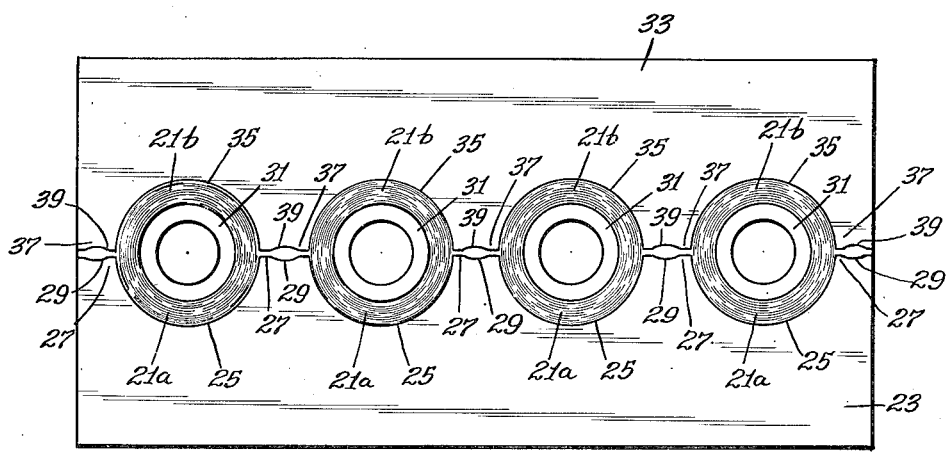

The relative position of the mold sections 23 and 33, the mandrels 31 and the two pads or bats 21a and 21b during the molding operation is shown in Fig. 4, and it will be seen that the two pads or bats 21a and 21b have been caused to take the shape of the four, tubularly shaped spaces or mold cavities provided between the two mold sections 23 and 33 by the grooves 25 and 35 and the mandrels 31. The portions 27 and 37 are tightly pressed together and will form in the finished structure, relatively dense, strong ribs or flanges interconnecting the filter elements.

Figure 5:
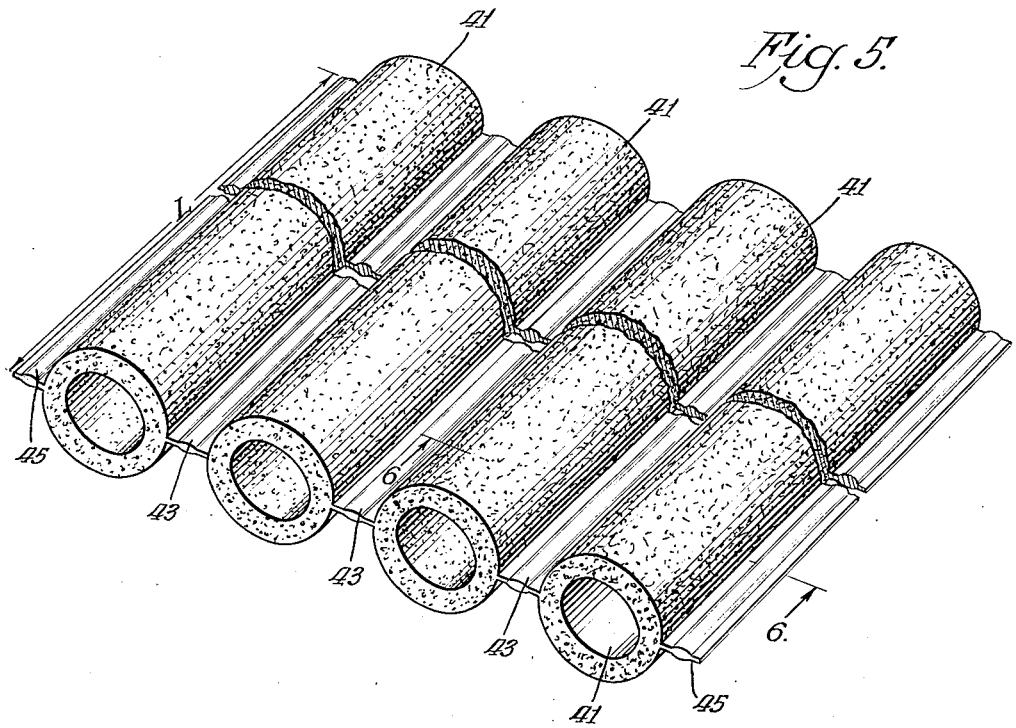
Fig. 5 is a perspective view illustrating one example of the final product resulting from the process illustrated generally in Figs. 2, 3 and 4.
Figure 6:
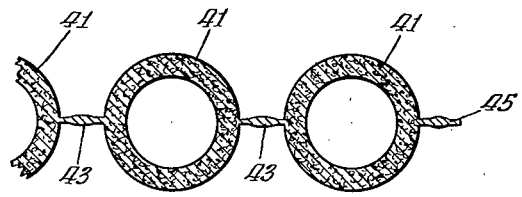
Fig. 6 is a fragmentary sectional view on the line 6—6 of Fig. 5.

An example of the multiple unit filter which results from the practice of a molding operation as described in the foregoing, is illustrated in Figs. 5 and 6. This unit comprises four hollow tubular filter elements 41 which are joined together by three, relatively dense, strong, ribs or flanges 43. Additional ribs 45 are provided along the outer edges of the unit. The filter elements 41 have approximately the same desirable filtering capabilities and characteristics as the convolutely wound filter elements of application Serial No. 601,874. However, they may be manufactured in a much shorter time and at a very much lower cost than the filter elements disclosed in that application. In addition to possessing substantially the same highly desirable filtering characteristics, the units of the present invention, by virtue of the interconnecting flanges or ribs 43 and 45 constitute a somewhat stronger structural element than the convolutely wound tube. The wall thickness of the individual filter elements 41 may, of course, be adjusted to suit any desired filter requirement and the length of the unit, the dimension L of Fig. 5, is limited only by the dimensions of the mold. Since a plurality of the filter elements are mechanically interconnected into a single structural member the replacement of filter units in a filter installation, as for example, a diesel fuel oil filter, is considerably facilitated, and the time involved is substantially reduced. If desired, the individual filter elements 41 can be sawn apart or any particular lengths of the unit may be cut off as desired. The unit is quite easily sawn and can be finished to dimension in much the same manner as wood.

During the molding operation the pressure which is applied to the portions of the pads or bats 21a and 21b engaged by the rib-forming portions 27 and 37 of the mold causes some of the impregnating resin to be forced back along the pad or bat sheets into the adjoining sections of the filter elements 41. This localized back flow of bonding material increases the resin concentration in the areas in which the abutting portions of the two pads or bats are to be joined together, and is believed to add considerably to the strength of these butt joints. The degree of back flow must be controlled quite carefully in order to prevent an excess of resin from being forced into the filter wall, and thereby reducing the filtering area and capacity of the completed filter element. The pressure which is applied to the rib-forming portions 27 and 37 of the mold is an important factor in determining resin back flow during the molding operation, although the resin content of the sheets constituting the pad or bat being molded is also important.

Accurate control of the back flow of resin into the filter elements during the molding operation can be conveniently accomplished by adjusting the dimensions of the secondary grooves 29 and 39 provided in the rib-forming portions 27 and 37 of the mold. The secondary grooves 29 and 39 reduce the pressure in the central area of those portions of the mold, and by suitable correlation of the dimensions of these grooves with the dimensions of the rib-forming portions, molding pressure, and resin concentration it is possible to obtain almost any reasonable degree of resin flow. Some control of the resin flow may also be obtained by varying the width of the rib-forming areas.

Since the joining of the abutting surfaces of the constituent plies of the filter element is accomplished primarily by an increased concentration of resin in those areas, as described above, the entire rib or flange 43 and 45, external to the surface of the completed filter unit 41, can be removed subsequent to the holding operation. The ribs or flanges 43 and 45 provided by the densely compressed areas in the final product provide some degree of rigidity to the filter element, and possibly contribute increased resistance against the tube bursting or collapsing under fluid pressure. The ribs or flanges also comprise a convenient means for anchoring or supporting the filter elements and for handling them in multiple. However, the filtering performance of the unit is substantially the same with the rib or flange removed as it was previously. The rib or flange sections serve their primary function in providing a source of additional resin for bonding together the abutting surfaces of the constituent sheets which make up the filter unit and, hence, so far as the filtering element is concerned, they may be removed once the unit has been formed.

Most conveniently the mold halves 23 and 33 are heated by the use of steam in the conventional manner, and the hollow mandrels 31 may be connected into the steam supply line for the mold halves in the well known manner. The mold temperature will necessarily depend upon the particular type plastic which is used as a bonding agent. For phenol formaldehyde resins, the surface temperature of the mold halves and the mandrels should be maintained at about 320° F. during the molding operation. When forming filter elements having a wall thickness of about ½ inch by the use of phenolic formaldehyde impregnated sheets, a molding time of from about 4 to 7 minutes was found satisfactory when using heated mandrels, and molding times of from 15 to 20 minutes were found satisfactory when using unheated mandrels.

It is very desirable that the mold and mandrel surfaces which contact the pads or bats which are to be formed into a filtering unit, shall be lubricated during the molding operation. Most of the usual mold lubricants appear to be satisfactory for this purpose, and particularly good results have been obtained by the use of a solution of a metallic soap such as aluminum stearate in benzene. Other metallic stearates are suitable, however, as are various of the silicones. The lubricant can be added to the sheet material of which the pads or bats are made or it can be applied to the mold surfaces.

The surfaces of the mold cavities which define the filter surfaces in the finished product are preferably slightly roughened in character, the surfaces produced by an ordinary sand blasting operation being particularly satisfactory. This roughened surface is not essential and satisfactory filter units can be manufactured with polished mold surfaces, but some improvement will result if the surface is roughened as above described.

It is not necessary to manufacture a multiple unit filter in the practice of the invention and under certain instances it may be found desirable to use the molding process herein disclosed to form a single filter element. A procedure adapted to this end is illustrated diagrammatically in Fig. 7. In this figure a single unit mold having upper and lower half sections 47 and 49 is arranged so that the mold sections may be moved into or out of engagement with each other. The mold sections 47 and 49 are provided with complementary semi-cylindrical grooves 51 which define the outer surface of the completed product and with two, opposed rib or flange forming surfaces 53 at one side thereof. The other sides of the two mold sections are provided with flat surfaces 55 which are adapted to engage each other when the mold is closed as shown by the dotted outline.

In the manufacture of a single unit by the use of a mold of this type a suitable length 57 of multiply, impregnated sheet material, similar to the pads or bats 21a and 21b of the previously described embodiment of the invention is folded over a suitable hollow mandrel 59 and is placed in the mold, as shown in Fig. 7. Following the placing of the mandrel 59 and the pad or bat 57 containing the uncured bonding material in the mold, the mold sections 47 and 49 are closed, and heated as described above. Here again the mandrel 59 may be heated or unheated as desired, although faster curing can be obtained when a heated mandrel is employed. The molding pressure for the filter body should be within the range of from about .2 to 2.0 pounds per square inch and from about 250 to 350 pounds per square inch between the rib forming mold surfaces 53.

The resultant filter element is shown at 61 in Fig. 8. The filter element 61 is similar to the single sections 41 of the multiple unit product shown in Fig. 5, except that it includes only a single rib or flange 63. It will be understood that a single tube filter element having a strengthening rib or flange on either side can be manufactured by using a mold having rib-forming surfaces at either side of the filter element defining grooves, and by the use of two pads or bats, similar to the method described for the manufacture of the multiple unit. The wrapping of a single pad or bat about the mandrel constitutes a somewhat easier method of handling the plastic impregnated sheet material.

In certain instances it may be found desirable to provide a filter element which is closed at one end. The process of the present invention lends itself particularly to the manufacture of such a unit since the mold may be constructed so as to press together or crimp one end of the filter section during the molding operation. When this type unit is to be made the mandrel should, of course, be provided with a suitably rounded end and should be accurately positioned in the mold so as to produce an end wall of the desired thickness. A filter element manufactured in this manner is illustrated at 63 in Figs. 9, 10 and 11. The main body of the filter element 63 is very similar to the single units 41 of the multiple product shown in Fig. 5, except for the fact that the rib or flange 65 extends entirely around one end of the filter element, which end is closed, as shown. The pad or bat product, from which the closed end filter element 63 is made, is pressed together and formed in the mold so as to mold together and to close the end of the tube. While a hemispherical end is shown at the closed end of the element 63, it will be apparent that the end might be squared off or formed at any desired shape. The multiply pad or bat material from which the filter unit is made is relatively soft and may be distorted considerably during the molding operation into any desired shape.

In the practice of the present invention it is possible to provide a tubular filter element of the type described which has a metal or fabric sleeve at the interior or exterior thereof. Such a sleeve may be used for strengthening purposes if made of metal, or if made of fabric, it may impart desired special filtering characteristics to the filter. One method of embodying such a sleeve into the filter element of the invention is shown in Fig. 12. As illustrated in that figure a sleeve 67 of wire gauze or other fabric is disposed about a mandrel 69 prior to the insertion of the mandrel into the mold, and the resultant filter product with the sleeve or gauze molded onto the internal surface thereof is illustrated at 71 in Fig. 13. If the sleeve is of sufficient strength, the mandrel 69 may be entirely eliminated during the molding operation and the sleeve 67 can be used instead.

The method of the present invention is also adapted for the production of filter elements which are in the general form of plates or discs and which are thus particularly suited for installation in filter structures of types other than those which require tubular filter elements. Filter structures of this type are commonly used for filtering diesel fuel oil, gasoline, dry-cleaning fluids, water, etc.

In the manufacture of a plate or disc filter element, in accordance with the procedure of the invention, it will be found convenient to utilize mold structures having an upper mold section 73 and having a lower mold section 75 of the general type illustrated in Fig. 14. These mold units are provided with cooperating surfaces 77 and 79 which define a circular cutting die and a mold cavity having the general form of a cylindrical disc. In order to provide a mounting flange and an edge reinforcement for the filter element the mold haves 73 and 75 include opposed, flat, annular surfaces 81 which are adapted to be separated a distance equal to the thickness of the edge flange when the mold is closed.

A pad or bat 83 of superposed, plastic impregnated, cellulosic sheets, as described in the foregoing, is placed within the mold centrally of the mold cavity in the lower half 75 of the mold structure, as shown in Fig. 14. The mold halves 73 and 75 are then moved together so as to cause the cutting surfaces 77 and 79 of the circular die portion of the mold to cut a circular disc from the pad or bat 83 of exactly the proper size to occupy the mold cavity. Further movement of the mold halves compresses the central portion of the pad or bat 83 with a pressure within the range of from about .2 to 2.0 pounds per square inch, and compresses the rim section of the pad or bat with a pressure of from about 250 to 350 pounds per square inch. The mold halves 73 and 75 are desirably hollow, as illustrated, in order that the mold surfaces may be heated, and the pressure and temperatures are correlated to effect substantial flow and bonding together of the constituent fibers of the impregnated sheets constituting the pad or bat in both the rim and central portions thereof.

The mold structure need not, of course, include a cutting die as a part thereof. A suitably shaped pad may be formed externally of the mold structure and put in place therein as the initial step of the molding operation.

The filter structure resulting from a molding operation as described above is shown in Figs. 15 and 16, and comprises a circular disc or plate member having a porous, low density, inner portion 85, which constitutes the filter wall of the element, and a dense, rigid, strong rim or flange portion 87 which, to some extent, reinforces and strengthens the element. The rim or flange portion 87 also provides a most convenient means for supporting the filter element in the associated apparatus, which may constitute a structure of the type shown in Fig. 17.

The filter means shown in Fig. 17 includes cooperating upper and lower sections 89 and 91, which are provided with suitable engaging flanges 93 and which are adapted to be bolted together by the use of suitable screw fastenings 94 to provide a filtering chamber 95 which is adapted to be connected into the oil line or other fluid circuit to be filtered. The rim or flange portion 87 of the disc filter element which is to be used in connection with a filter of this type is desirably provided with suitable holes 97 to receive the screw fastenings 94, and is bolted into place with or without a sealing gasket; such as is indicated at 99. The halves of the filter device include inlet and outlet connections of conventional type, as indicated at 100.

It will be apparent that a filter as described above is a very simple, easily constructed device, and it is of such design that the replacement of the filter element involves little more than the opening of the filter casing. Further due to the close dimensional tolerances which can be obtained in the highly compressed rim or flange portion of the filter element, the obtaining of a fluid tight seal is easily accomplished.

A disc or plate filter element in accordance with the invention can be made in almost any shape, and it need not be flat. A square form of the filter element is illustrated at 101 in Figs. 18 and 19, and it will be noted that this element also includes a peripheral rib or flange 103. This rib or flange 103 is made by compressing the edge portions of the pad or bat in exactly the same manner as the rim or flange portion of the structure illustrated in Figs. 15 and 16.

In the foregoing I have disclosed an improved method for manufacturing self-supporting filter elements of various types from multi-ply pads or bats of plastic impregnated, cellulosic, sheet material. I have also disclosed a number of improved filter elements which result from the practice of the method of the invention. The various features of my invention believed to be new are set forth in the appended claims.

I claim the following:

1. A filter element of the class described, comprising a porous, low density filter wall which is adapted to be interposed in the path of flow of liquid material to be filtered, said filter wall comprising a plurality of superposed sheets of thin, creped, cellulosic tissue which are bonded together by a plastic bonding material which substantially impregnates the constituent cellulosic fibers of said sheets, and at least one rib or flange member of relatively high density, compressed, plastic impregnated, cellulosic material which adjoins said low density wall portion and which is integrally bonded thereto by a localized concentration of said plastic bonding material extending from said rib or flange member into said low density wall portion.

2. A filter element of the class described, comprising a porous, low density, tubular, filter member which is adapted to be interposed in the path of flow of liquid material to be filtered, said tubular member comprising a plurality of superposed sheets of thin, creped, cellulosic tissue which are bonded together by a plastic bonding material which substantially impregnates the constituent cellulosic fibers of said sheets, and means at least one rib or flange of relatively high density, compressed, plastic impregnated, cellulosic material which extends along one side of said tubular member and which is integrally bonded thereto by a localized concentration of said plastic bonding material extending from said rib or flange member into said low density tubular member.

3. A filter element of the class described, comprising a porous, low density, filter wall which is adapted to be interposed in the path of flow of liquid material to be filtered, said filter wall comprising a plurality of superposed sheets of thin, creped, cellulosic tissue which are bonded together by a plastic bonding material which substantially impregnates the constituent cellulosic fibers of said sheets and which is present in an amount equal to from about 25 to 65 per cent of the weight of said filter wall, there being at least about 240 of the bonded together sheets per inch of thickness of the filter wall, and said filter wall having a specific gravity within the range of from about .20 to .45, and at least one rib or flange member of relatively high density, compressed, plastic impregnated, cellulosic material which adjoins said low density wall portion and which is integrally bonded thereto by a localized concentration of said plastic bonding material extending from said rib or flange member into said low density wall portion.

4. A filter element of the class described comprising a porous, low density, tubular filter member which is adapted to be interposed in the path of flow of liquid material to be filtered, said tubular member comprising a plurality of superposed sheets of thin, creped, cellulosic tissue which are bonded together by a plastic bonding material which substantially impregnates the constituent cellulosic fibers of said sheets, said sheets having a dryer basis weight within the range of from about 5 to 10 pounds for 480 sheets 24 by 36 inches and a crepe ratio, when manufactured, of from about 1.4 to 3.0, said plastic bonding material being present in said bonded together sheets in an amount which is equal to from about 25 to 65 per cent of the weight of said filter member, said filter member having a specific gravity within the range of from about .20 to .45 and there being at least about 240 plies per inch of thickness thereof, and at least one rib or flange of relatively high density, compressed, plastic impregnated, cellulosic material which extends along one side of said tubular member and which is integrally bonded thereto by a localized concentration of said plastic bonding material extending from said rib or flange member into said low density tubular member.

5. A filter element of the class described comprising a plurality of spaced-apart, low density, tubular filter members which are adapted to be interposed in the path of flow of liquid material to be filtered, each of said tubular members comprising a plurality of superposed sheets of thin, creped, cellulosic tissue which are bonded together by a plastic bonding material which substantially impregnates the constituent cellulosic fibers of said sheets, and means for mechanically interconnecting said filter members, said means comprising thin, dense sections of compressed, plastic impregnated, cellulosic material which extend between said filter members and which are integrally bonded thereto by means of localized concentrations of said plastic bonding material which extend from the edges of said rib or flange members into said low density, tubular filter members.

6. A filter element of the class described comprising a plurality of spaced-apart, low density, filter members which are adapted to be interposed in the path of flow of liquid material to be filtered, said filter members comprising a plurality of superposed sheets of thin, creped, cellulosic tissue which are bonded together by a plastic bonding material which substantially impregnates the constituent cellulosic fibers of said sheets, and which is present in an amount equal to from about 25 to 65 per cent of the weight of said filter members, there being at least about 240 of the bonded together sheets per inch of thickness of said filter members, and said filter members having a specific gravity within the range of from about .20 to .45, and means for mechanically interconnecting said filter members, said means comprising rib or flange members of relatively high density, compressed, plastic impregnated, cellulosic material which extend between said spaced-apart filter members and which are integrally bonded thereto by means of localized concentrations of said plastic bonding material which extend from the edges of said rib or flange member into said low density, tubular filter members.

7. A filter element of the class described comprising a plurality of spaced-apart, low density, tubular filter members which are adapted to be interposed in the path of flow of liquid material to be filtered, each of said tubular members comprising a plurality of superposed sheets of thin, creped, cellulosic tissue which are bonded together by a plastic bonding material which substantially impregnates the constituent cellulosic fibers of said sheets, said sheets having a dryer basis weight within the range of from about 5 to 10 pounds for 480 sheets 24 by 36 inches and a crepe ratio, when manufactured, of from about 1.4 to 3.0, said plastic bonding material being present in said bonded together sheets in an amount which is equal to from about 25 to 65 per cent of the weight of said filter members, said filter members having a specific gravity within the range of from about .20 to .45 and there being at least about 240 plies per inch of thickness thereof, and means for mechanically interconnecting said filter members, said means comprising thin, dense sections of compressed, plastic impregnated, cellulosic material which extend between said filter members and which are integrally bonded thereto by means of localized concentrations of said plastic bonding material which extend from the edges of said rib or flange members into said low density, tubular filter members.

8. A filter element of the class described comprising a porous, low density, tubular member which is adapted to be interposed in the path of flow of liquid material to be filtered, said tubular member being closed at one end thereof and comprising a plurality of sheets of thin, creped, cellulosic tissue which are bonded together by a plastic bonding material which substantially impregnates the constituent cellulosic fibers of said sheets, and at least one rib or flange of relatively high density, compressed, plastic impregnated, cellulosic material integrally bonded to the closed end of said member and to at least one side thereof by means which includes a localized concentration of said plastic bonding material extending from said rib or flange into said tubular member.

9. A disc or plate shaped filter element of the class described, comprising a plurality of superposed sheets of thin, creped, cellulosic tissue which are bonded together by a plastic bonding material which substantially impregnates the constituent cellulosic fibers of said sheets, the major portion of said filter element comprising a porous, low density filter wall which is adapted to be interposed in the path of flow of liquid material to be filtered, at least a portion of the edge of said element being consolidated to provide a relatively dense, strong, non-porous, rib or flange which is adapted to serve as a support or mounting for said filter wall portion and which is integrally bonded thereto by means of a localized concentration of said plastic bonding material which extends from said rib or flange member into the adjacent portions of said low density, filter wall.

JOHN E. VALENTE.

REFERENCES CITED

The following references are of record in the file of this patent:

UNITED STATES PATENTS

| Number | Name | Date |
|---|---|---|
| 1,006,070 | Durham | Oct. 17, 1911 |
| 1,370,023 | Kempton | Mar. 1, 1921 |
| 1,999,384 | Woodall | Apr. 30, 1935 |
| 2,023,268 | Dodge | Dec. 3, 1935 |
| 2,039,312 | Goldman | May 5, 1936 |
| 2,084,582 | Goldman | June 22, 1937 |
| 2,147,792 | Knight | Feb. 21, 1939 |
| 2,170,655 | Fourness | Aug. 22, 1939 |
| 2,196,821 | Arnold | Apr. 9, 1940 |
| 2,292,513 | Fourness et al. | Aug. 11, 1942 |
| 2,343,930 | Rowe | Mar. 14, 1944 |
| 2,399,256 | Rowe | Apr. 30, 1946 |
| 2,427,733 | McCann | Sept. 23, 1947 |